C. Korn.
Leaching Bark.

Nº 71765. Patented Dec. 3, 1867.

Witnesses: Inventor:

United States Patent Office.

CHARLES KORN, OF WURTSBOROUGH, NEW YORK.

Letters Patent No. 71,765, dated December 3, 1867.

IMPROVED APPARATUS FOR LEACHING BARK.

*The Schedule referred to in these Letters Patent and making part of the same.*

TO ALL WHOM IT MAY CONCERN:

Be it known that I, CHARLES KORN, of Wurtsborough, in the county of Sullivan, and State of New York, have invented a new and improved Apparatus for Leaching Tan-Bark; and I do hereby declare that the following is a full, clear, and exact description of the same, which will enable others skilled in the art to make and use my invention, reference being had to the accompanying plate of drawings, and the letters of reference marked thereon, forming part of this specification.

Similar letters of reference indicate corresponding parts.

This invention relates to a new apparatus for leaching tan-bark, and consists in the use of a vat, which is divided into various compartments, which are connected in such a manner that the tanning-liquid will constantly circulate through the same in any required order or succession.

The object of the invention is to utilize what is left of spent bark, and also to mix liquids of various strength, as they are produced in the various compartments, and thereby to produce a liquid of a certain desired richness.

Figure 1:
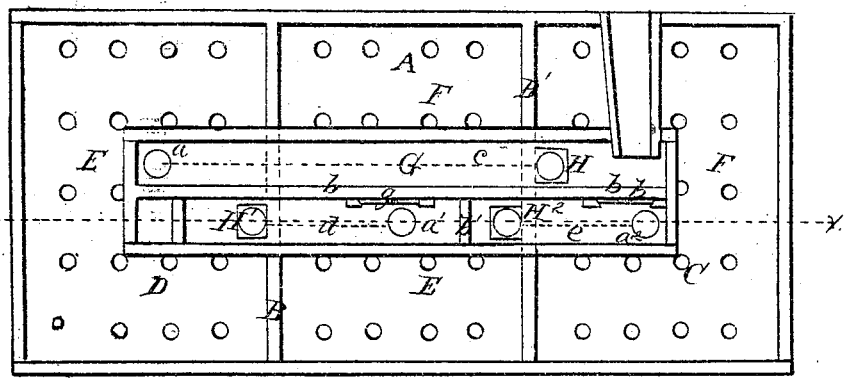
Figure 1 represents a plan or top view of my improved apparatus.
Figure 2:
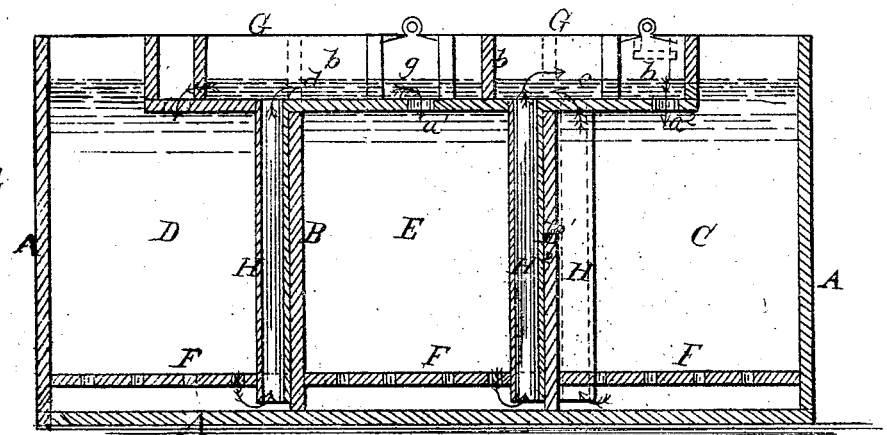
Figures 2 and 3 are longitudinal vertical sections of the same, the plane of section being indicated by the line $x\,x$ in fig. 1.

A represents a wooden vessel, of oblong or other suitable form, and of any suitable dimensions. It is divided by means of partitions B B' into three, or more or less, compartments. In the drawing, three compartments, C, D, and E are represented. Each compartment is provided with a perforated false bottom, F, as is clearly shown in figs. 2 and 3. In the upper part of the vessel A is arranged a trough, G, which is supported by the partitions B B', or by the sides of the vessel or otherwise. The bottom of the trough is somewhat below the level of the liquid when the device is in operation. H $H^1$ $H^2$ are pipes, which reach from the bottom of the trough G to the lower part of each compartment below the false bottom, but not to the real bottom, as shown. Thus, when liquor is poured into a compartment, to the height indicated in the drawing, it will fill the tube H, $H^1$ or $H^2$, and will thereby enter the trough, the tube being open at both ends. In the trough G are also holes, $a$, $a^1$, and $a^2$, which communicate with the vessel, C, D, and E, respectively. By means of partitions $b$ and $b'$ the trough is divided into as many compartments, $c$, $d$, and $e$, as the vessel A, and as shown in fig. 1.

The operation is as follows: The liquid is poured into the vessel C, in which weak or spent bark may be contained, and flows through the pipe H into the compartment $c$ of the trough. Thence it flows through the hole $a$ into the compartment D, in which perhaps another kind of bark is contained. From the compartment D, the liquid passes through the pipe $H^1$ into the compartment $d$ of the trough, and is thence discharged through the hole $a^1$ into the vessel E, in which again some other kind of bark may be contained. From the latter it passes through the pipe $H^2$ into the compartment $e$ of the trough, whence it flows through the hole $a^2$ back into the vessel C again. Thus the liquid can be kept constantly circulating through the various vessels of the apparatus, and as various kinds of bark may be contained in the various compartments, a mixture of any desired strength or composition may be produced. If it is desired to mix the contents of some of the compartments, so as not to come in contact with those of the other compartments, the connections to such vessels containing the liquid to be left intact must be closed, and gates in the partitions of the trough must be opened.

Figure 3:
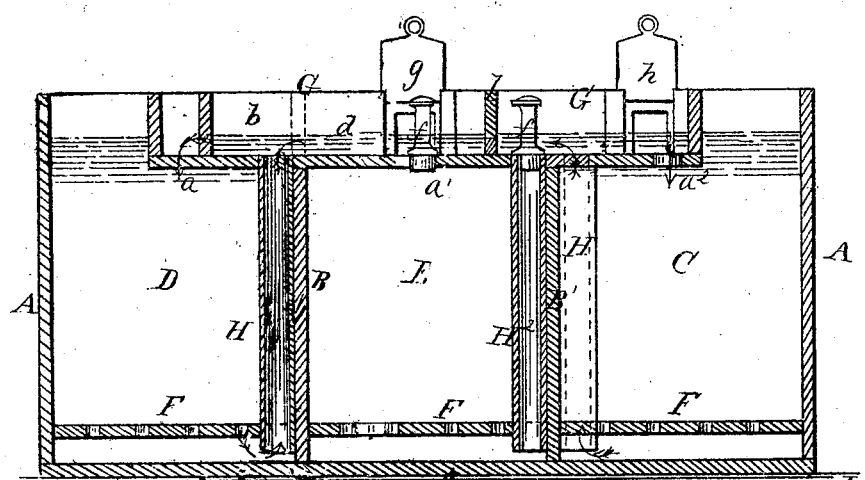

Thus, for example, if the contents of the vessels C and D are to be mixed, while those of the vessel E are not to be disturbed, the arrangements must be as follows: The liquid will rise in the vessel C, through the tube H into the compartment $c$ of the trough, and will flow thence through the hole $a$ into the vessel D. Thence it will rise through the pipe $H^1$ into the compartment $d$ of the trough. Thence it would flow through the hole $a^1$ into the vessel C, to prevent which the hole $a^1$ must be closed by a plug or valve, $f$, as shown in fig. 3. A gate in the partition $b$ of the trough is then opened to let the liquid into the compartment $c$ of the trough, where it will mix with the stream passing between the vessels C and D; and when it is to be finally collected in the vessel C a gate, $h$, in the partition $b$, is opened, letting the liquid into the compartment $e$ of the trough. In the compartment $e$ the pipe $H^2$ must be closed by a plug or valve, as shown in fig. 3, while the liquid will flow back into the vessel C through the hole $a^2$. By this arrangement of gates and plugs, the contents of any two or more compartments may be made to circulate without coming in contact with those of the other compartments in the same vessel.

Having thus described my invention, I claim as new, and desire to secure by Letters Patent—

1. The vessel A when divided by means of partitions B B' into various compartments, which are connected by means of pipes H with a perforated trough, G, the latter being also subdivided by means of partitions, substantially as set forth, all made and operating so that a constant circulation of the tanning-liquid may be established between all the compartments, as herein shown and described.

2. Providing the partition of the trough G with gates, and the pipes and holes arranged in the bottom of the trough with plugs or valves, substantially as described, so that the contents of some of the compartments may be made to circulate, leaving those of the other compartments intact, as set forth.

CHARLES KORN.

Witnesses:
WM. F. McNAMARA,
ALEX. F. ROBERTS.